(12) United States Patent
Ogle et al.

(10) Patent No.: US 11,756,139 B2
(45) Date of Patent: *Sep. 12, 2023

(54) SYSTEM AND METHOD FOR MAKING RESERVATIONS IN A HOSPITALITY ESTABLISHMENT

(71) Applicant: Enseo, LLC, Plano, TX (US)

(72) Inventors: Vanessa Ogle, Fairview, TX (US); William C. Fang, Plano, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,946

(22) Filed: Jun. 21, 2022

(65) Prior Publication Data

US 2022/0318932 A1 Oct. 6, 2022

Related U.S. Application Data

(63) Continuation of application No. 17/018,152, filed on Sep. 11, 2020, now Pat. No. 11,367,154, which is a (Continued)

(51) Int. Cl.
*H04N 21/214* (2011.01)
*H04N 21/414* (2011.01)
*H04N 21/4363* (2011.01)
*H04N 21/442* (2011.01)
(Continued)

(52) U.S. Cl.
CPC ............ *G06Q 50/12* (2013.01); *G06F 16/29* (2019.01); *G06Q 10/02* (2013.01); *G06Q 50/14* (2013.01); *G06T 11/60* (2013.01); *G06T 15/20* (2013.01); *G06T 17/05* (2013.01); *G06T 19/00* (2013.01); *H04N 21/2143* (2013.01); *H04N 21/414* (2013.01); *H04N 21/43637* (2013.01); *H04N 21/4425* (2013.01); *H04N 21/44227* (2013.01); *G06T 2219/004* (2013.01); *H04N 21/8146* (2013.01)

(58) Field of Classification Search
CPC ............ H04N 21/214; H04N 21/2143; H04N 21/42204; H04N 21/431; H04N 21/472; G06Q 50/12; G06Q 10/02; G06Q 50/14; G06F 17/30241; G06T 11/60; G06T 15/20

See application file for complete search history.

(56) References Cited

U.S. PATENT DOCUMENTS 5,047,614 A 9/1991 Bianco
5,732,398 A 3/1998 Tagawa et al.
(Continued)

*Primary Examiner* — Kyu Chae
(74) *Attorney, Agent, or Firm* — Scott Griggs; Griggs Bergen LLP

(57) ABSTRACT

A system and method for making reservations in a hospitality establishment are disclosed. In one embodiment of the system, a database includes multiple the media source files relative to guest room spaces within a room. A server which handles reservations renders a map view of the hospitality establishment based on obtained map data. The map view includes a graphical representation of the room as well as other rooms. In response to the room being selected, the graphical representation of the selected room is annotated with room reservation data and at least one of the media source files of the selected room. The server may execute a reservation for the selected room.

6 Claims, 8 Drawing Sheets

Related U.S. Application Data continuation of application No. 15/955,834, filed on Apr. 18, 2018, now Pat. No. 10,776,887, which is a continuation-in-part of application No. 15/893,389, filed on Feb. 9, 2018, now abandoned, which is a continuation-in-part of application No. 15/887,833, filed on Feb. 2, 2018, now abandoned.

(60) Provisional application No. 62/486,840, filed on Apr. 18, 2017, provisional application No. 62/458,892, filed on Feb. 14, 2017, provisional application No. 62/455,819, filed on Feb. 7, 2017.

(51) Int. Cl.
| | | |
|---|---|---|
| *H04N 21/4425* | (2011.01) | |
| *H04N 21/81* | (2011.01) | |
| *G06Q 50/12* | (2012.01) | |
| *G06T 15/20* | (2011.01) | |
| *G06Q 50/14* | (2012.01) | |
| *G06T 11/60* | (2006.01) | |
| *G06Q 10/02* | (2012.01) | |
| *G06F 16/29* | (2019.01) | |
| *G06T 17/05* | (2011.01) | |
| *G06T 19/00* | (2011.01) | |

(56) References Cited

U.S. PATENT DOCUMENTS

| | | |
|---|---|---|
| 5,832,452 A | 11/1998 | Schneider et al. |
| 6,181,349 B1 | 1/2001 | Bardon et al. |
| 6,249,773 B1 | 6/2001 | Allard et al. |
| 6,404,877 B1 | 6/2002 | Bolduc et al. |
| 6,550,672 B1 | 4/2003 | Tracy et al. |
| 6,990,457 B1 | 1/2006 | Litman et al. |
| 9,064,341 B2 | 6/2015 | Hultquist et al. |
| 11,367,154 B2* | 6/2022 | Ogle ............... H04N 21/44227 |
| 2001/0016825 A1 | 8/2001 | Pugliese, III et al. |
| 2009/0031246 A1* | 1/2009 | Cowtan ................ G06Q 30/00 |
| | | 715/854 |
| 2009/0133090 A1 | 5/2009 | Busse |
| 2009/0228779 A1 | 9/2009 | Williamson et al. |
| 2010/0083335 A1 | 4/2010 | Talbert |
| 2011/0207531 A1 | 8/2011 | Gagner |
| 2011/0314502 A1* | 12/2011 | Levy .................. H04N 21/4532 |
| | | 725/46 |
| 2012/0066275 A1* | 3/2012 | Gerstner ............... G06F 16/29 |
| | | 707/825 |
| 2012/0089713 A1 | 4/2012 | Carriere |
| 2012/0241525 A1 | 9/2012 | Borges |
| 2013/0226712 A1 | 8/2013 | Lietslmi |
| 2013/0236093 A1 | 9/2013 | Gatt et al. |
| 2013/0321442 A1 | 12/2013 | Van Os et al. |
| 2015/0058909 A1 | 2/2015 | Miller et al. |
| 2016/0350444 A1* | 12/2016 | Sarao .................... G06F 30/13 |
| 2017/0004590 A1* | 1/2017 | Gluhovsky ........ G06Q 30/0204 |
| 2017/0068926 A1 | 3/2017 | Eom et al. |
| 2018/0063256 A1 | 3/2018 | Warrick et al. |
| 2018/0077356 A1* | 3/2018 | Zilberman ......... H04N 5/23222 |
| 2018/0101793 A1* | 4/2018 | Steinberg ........... G06F 16/9535 |
| 2018/0276771 A1 | 9/2018 | Ogle et al. |
| 2020/0410610 A1 | 12/2020 | Ogle et al. |

* cited by examiner

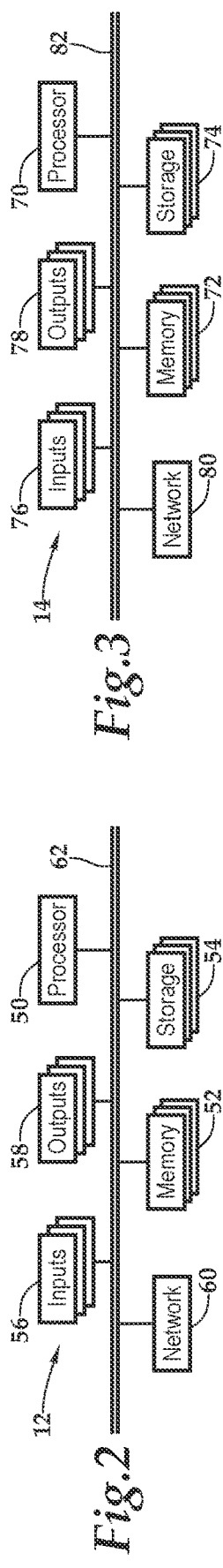
Fig.2
Fig.3
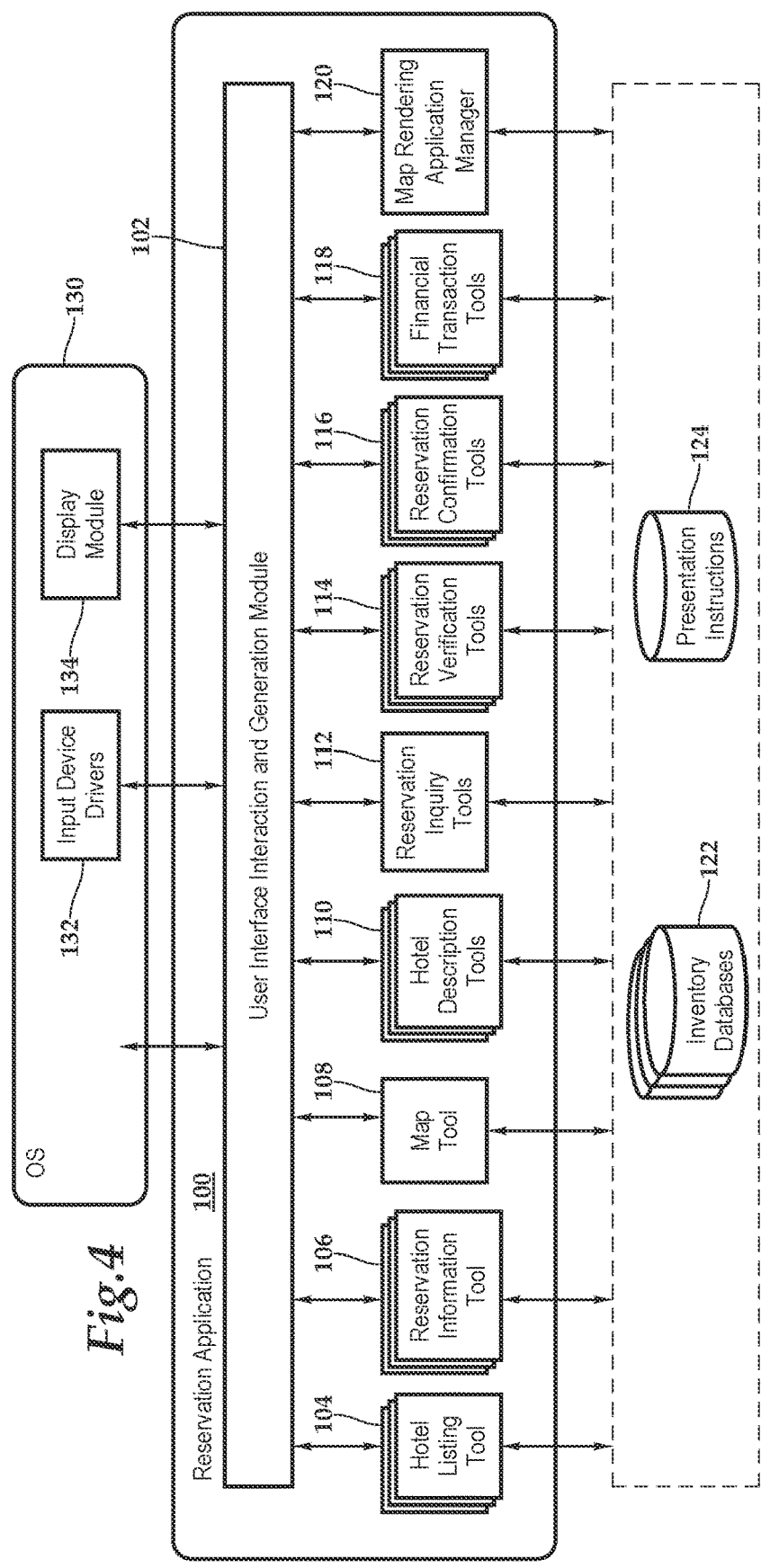
Fig.4

SYSTEM AND METHOD FOR MAKING RESERVATIONS IN A HOSPITALITY ESTABLISHMENT

PRIORITY STATEMENT & CROSS-REFERENCE TO RELATED APPLICATIONS

This application is a continuation of U.S. patent application Ser. No. 17/018,152 entitled "System and Method for Making Reservations in a Hospitality Establishment" and filed on Sep. 11, 2020, in the names of Vanessa Ogle et al., now U.S. Pat. No. 11,367,154, issued on Jun. 21, 2022; which is a continuation of U.S. patent application Ser. No. 15/955,834 entitled "System and Method for Making Reservations in a Hospitality Establishment" and filed on Apr. 18, 2018, in the names of Vanessa Ogle, et al., now U.S. Pat. No. 10,776,887, issued Sep. 15, 2020; which claims the benefit of United States Patent Application No. 62/486,840 entitled "System and Method for Making Reservations in a Hospitality Establishment" and filed on Apr. 18, 2017, in the names of Vanessa Ogle, et al.; all of which are hereby incorporated by reference, in entirety, for all purposes. U.S. patent application Ser. No. 15/955,834 is also a continuation-in-part of U.S. patent application Ser. No. 15/893,389 entitled "Entertainment Center Technical Configuration and System and Method for Use of Same" and filed on Feb. 9, 2018, in the names of William C. Fang et al.; which claims the benefit of United States Patent Application No. 62/458,892 entitled "Entertainment Center Technical Configuration and System and Method for Use of Same" and filed on Feb. 14, 2017, in the names of William C. Fang et al.; both of which are hereby incorporated by reference, in entirety, for all purposes. U.S. patent application Ser. No. 15/893,389 is also a continuation-in part of U.S. application Ser. No. 15/887,833 entitled Entertainment Center Technical Configuration and System and Method for Use of Same" and filed on Feb. 2, 2018 in the names of William C. Fang et al; which claims the benefit of United States Patent Application No. 62/455,819 entitled Entertainment Center Technical Configuration and System and Method for Use of Same" and filed on Feb. 7, 2017 in the names of William C. Fang et al; all of which are hereby incorporated, in entirety, by reference for all purposes.

TECHNICAL FIELD OF THE INVENTION

This invention relates, in general, to electronic reservation systems and, in particular, to systems and methods for making reservations and lodging arrangements in a hospitality establishment, such as a hotel.

BACKGROUND OF THE INVENTION

When planning a business trip or vacation, travelers have a wide range of sources through which to make reservations and lodging arrangements at a hospitality establishment, such as a hotel. Increasingly, travelers make reservations online. During the online hospitality reservation process, travelers are presented with a variety of choices about potential room reservations. Online hospitality reservation systems attempt to provide an ever-increasing quality and quantity of information in a digestible fashion about potential room reservations to improve the accuracy and convenience of the online hospitality reservation experience. As a result of limitations in existing technology, the quality and quantity of information about potential room reservations is lacking. Accordingly, there is a need for improved systems and methods for making reservations and lodging arrangements in hospitality establishments, such as hotels.

SUMMARY OF THE INVENTION

It would be advantageous to introduce systems and methods that further the presentation of information regarding potential room reservations in hospitality lodging establishments and other transitory establishments to ensure a higher rate of completion of reservations and reduce misinformation. It would also be desirable to enable a computer-based solution that would improve the quality and quantity of information about potential room reservations. To better address one or more of these concerns, a system and method for making reservations in a hospitality establishment are disclosed. In one embodiment of the system, a database includes multiple media source files relative to guest room spaces within a room. A server which handles reservations renders a map view of the hospitality establishment based on obtained map data. The map view includes a graphical representation of the room as well as other rooms. In response to the room being selected, the graphical representation of the selected room is annotated with room reservation data and at least one of the media source files of the selected room. The server may execute a reservation for the selected room. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2 is a functional block diagram depicting one embodiment of a server presented in FIGS. 2A and 2B;

FIG. 3 is a functional block diagram depicting one embodiment of a server presented in FIGS. 2A and 2B;

FIG. 4 is a conceptual module diagram depicting the software architecture of an image viewing, editing, and organization application of some embodiments;

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
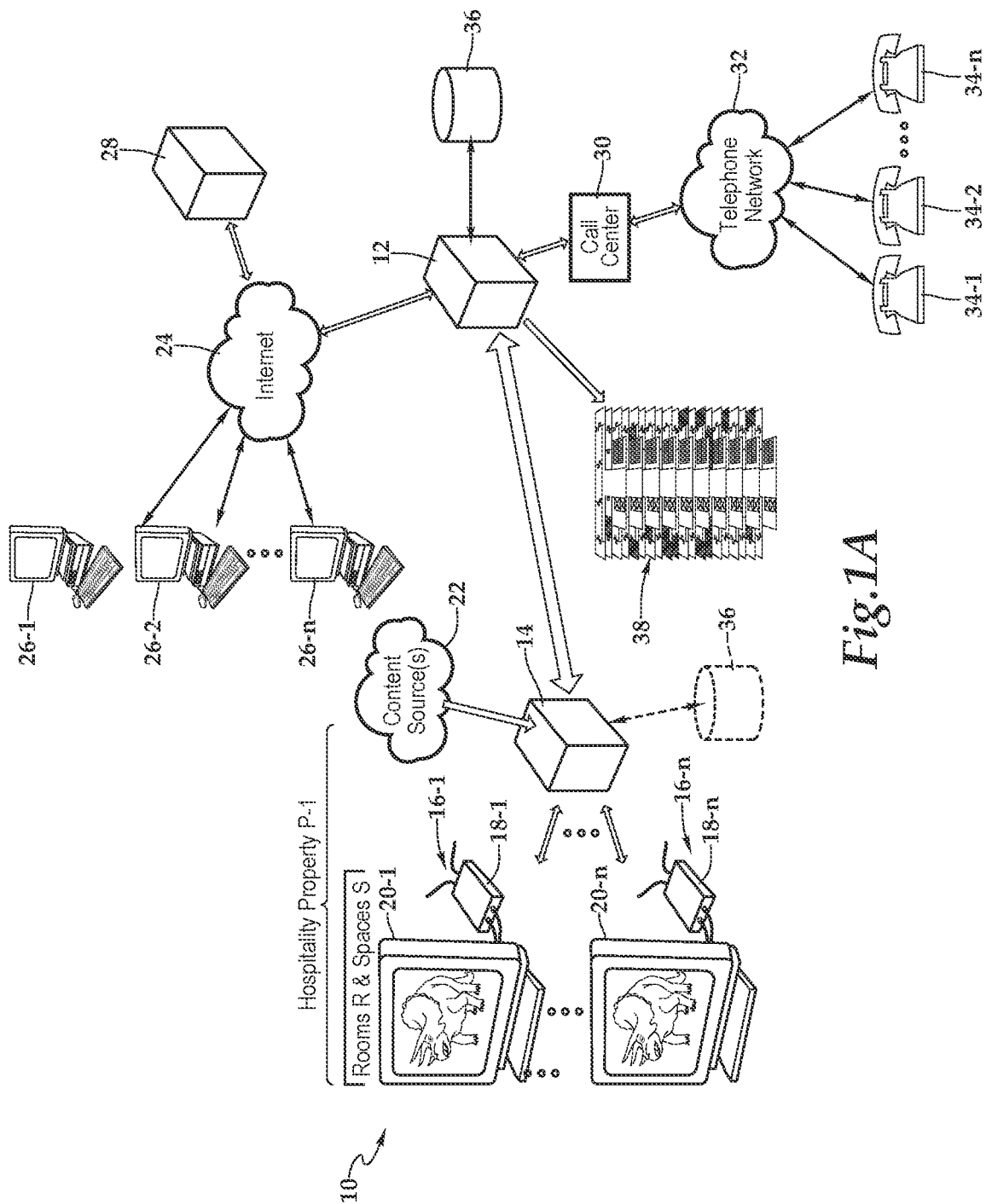
FIG. 1A is a schematic diagram depicting one embodiment of the system of FIG. 1 within an on-property deployment.
Figure 1B:
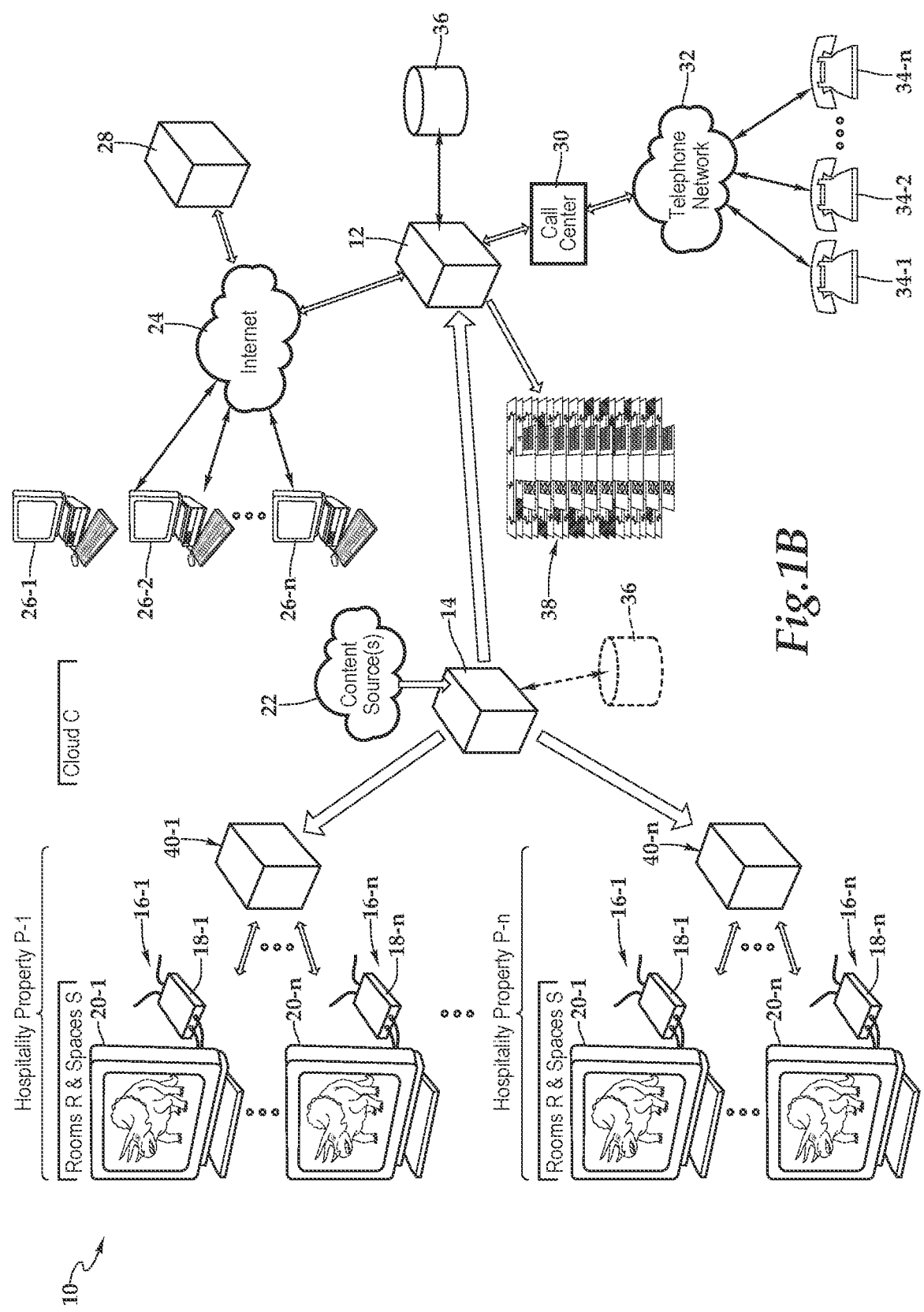
FIG. 1B is a schematic diagram depicting one embodiment of the system of FIG. 1 within a cloud-computing deployment.

Referring initially to FIG. 1A and FIG. 1B, in two respective embodiments, a system 10 for making reservations in a hospitality establishment is depicted. The hospitality lodging establishment, which may be referred to as a hospitality property, may be a furnished multi-family residence, dormitory, lodging establishment, hotel, hospital, or other multi-unit environment. With reference to FIG. 1A, a server 12 handles reservations, including the making of arrangements for rooms in the hospitality establishment, which is designated as hospitality property P-1 and includes various rooms R and spaces S. As shown, the server 12 includes a housing and is connected via the Internet or other network connection, to a server 14, which also includes a housing and may be located on a single property P-1, to serve one or more entertainment centers 16-1 . . . 16-n. As shown, each of the entertainment centers 16-1 . . . 16-n may respectively include set-top boxes 18-1 . . . 18-n paired with displays 20-1 . . . 20-n. Content sources 22, such as video-on-demand, the Internet, and cable television, for example, are delivered by the server 14 to the entertainment centers 16-1 . . . 16-n.

The server 12 is also connected to the Internet 24 and various potential guests, as represented by computers 26-1, 26-2, . . . 26-n desiring to reserve rooms in hotels or other hospitality properties via the server 12. Additionally, a financial transaction server 28 may be coupled to the server via the Internet 24 in order to complete any financial transactions from potential customers. Further, the server 12 may also be coupled to a call center 30, which is coupled to any appropriate telephone network 32, such as the Public Switched Telephone Network (PSTN), and includes one or more operators that receive calls from potential customers with the use of telephones 34-1, 34-2, . . . 34-n.

In one operational embodiment, the entertainment center 16-1, for example, sends an installation quality assurance signal relative to the execution of a technical protocol. By way of example, the server 14 receives the installation quality assurance signal from the entertainment center 16-1 and establishes installation quality assurance of the room based on the installation quality assurance signal. In one embodiment, substantially contemporaneously with the execution of the technical protocol, the server 14 receives from an interactive programmable device located within the room, media of a unique identifier of the room, a unique identifier of the display 20-1, a unique identifier of the set-top box 18-1, a physical connection between the set-top box 18-1 and the display 20-1, the welcome screen on the display 20-1, and a machine-readable optical label. The interactive programmable device may be a camera, video equipment, smartphone, tablet, or laptop computer, for example.

These instances of media, which may be images or video, are utilized to establish physical quality assurance of the room. Furthermore, substantially contemporaneously with the execution of the technical protocol, the server 14 receives from the interactive programmable device located within the room, media of the view from the room, the bed or beds in the room, and the bathroom, for example. These instances of media are utilized to remotely establish the furnishings and amenities in the room and create a virtual interactive experience of the room. The instances of media that establish the furnishings and amenities in the room may be stored in a database 36 as media sources files. The database may be associated with the server 12 or integrated therewith, or associated with the server 14.

In operation, the server 12 renders a map view 38 of the hospitality property P-1 based on obtained map data. The map view 38 may include, as will be discussed in further detail hereinbelow, a graphical representation of various rooms in the hospitality property P-1. A potential customer may interact with the server 12 via one of the computers 26-1, 26-2, . . . , 26-n, or via the call center 30. In response to a room being selected as a candidate for a reservation, the selected room is annotated with room reservation data and at least one of the media source files associated with the selected room that are stored in the database 36. The server 12 may execute a reservation for the selected room and the resulting necessary financial transaction may be executed utilizing the financial transaction server 28.

Referring to FIG. 1B, the system 10 may be deployed such that the server 14 is located remotely within cloud C relative to the entertainment centers 16-1 . . . 16-n, which are located at the hospitality properties P-1 through P-n. In particular, the server 14, which receives content from content sources 22, may be located remotely relative to the entertainment centers 16-1 . . . 16-n such that a property headend 40-1 . . . 40-n is interposed between the server 14 and the entertainment centers 16-1 . . . 16-n. As shown, in this implementation, the property headend 40-1 . . . 40-n is co-located with the entertainment centers 16-1 . . . 16-n at a respective hospitality property, P-1 through P-n. As previously discussed, the server 12 may render a map view 38 of the hospitality establishment that may be annotated and the server 12 may complete a reservation.

Referring now to FIG. 2, one embodiment of the server 12 as a computing device includes a processor 50, memory 52, storage 54, inputs 56, outputs 58, and a network adaptor 60 interconnected with various buses 62 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 50 may process instructions for execution within the server 12, including instructions stored in the memory 52 or in storage 54. The memory 52 stores information within the computing device. In one implementation, the memory 52 is a volatile memory unit or units. In another implementation, the memory 52 is a non-volatile memory unit or units. Storage 54 includes capacity that is capable of providing mass storage for the server 12. Various inputs 56 and outputs 58 provide connections to and from the server 12, wherein the inputs 56 are the signals or data received by the server 12, and the outputs 58 are the signals or data sent from the server 12. The network adaptor 60 couples the server 12 to a network such that the server 12 may be part of a network of computers, a local area network (LAN), a wide area network (WAN), an intranet, a network of networks, or the Internet, for example.

The memory 52 and storage 54 are accessible to the processor 50 and include processor-executable instructions that, when executed, cause the processor 50 to execute a series of operations. In one embodiment, the processor-executable instructions cause the processor 50 to render a map view of the hospitality property based on obtained map data. The map view may include a graphical representation of the room and other rooms at the hospitality property. The processor-executable instructions may relate to the rendering of a 3-D perspective view of the hospitality property, a multi-floor view of the hospitality property, a 2-D top plan view of at least a portion of the hospitality establishment, and a map view of a floor of the hospitality property.

Further, the processor-executable instructions may cause the processor 50 to annotate the graphical representation of the room and the other rooms to indicate room availability, and, in response to receiving the room as the selected room, the graphical representation of the selected room with room reservation data. The processor 50 may also be caused to annotate the graphical representation of the selected room with at least one of the media source files of the selected room. The media source files may be at least partially integrated into the graphical representation of the room or the media source files may be at least partially combined into the graphical representation of the room. The processor-executable instructions may also cause the processor to execute a reservation for the selected room. The processor-executable instructions may also include instructions that cause the processor to implement a reservation application configured to provide a user interface and obtain instructions from a user, such as a potential customer or call center worker, on the desired map view and annotations and other room reservation information.

Referring now to FIG. 3, one embodiment of the server 14 as a computing device includes a processor 70, memory 72, storage 74, inputs 76, outputs 78, and a network adaptor 80 interconnected with various buses 82 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 70 may process instructions for execution within the server 14, including instructions stored in the memory 72 or in storage 74. The memory 72 stores information within the computing device. In one implementation, the memory 72 is a volatile memory unit or units. In another implementation, the memory 72 is a non-volatile memory unit or units. Storage 74 includes capacity that is capable of providing mass storage for the server 14. Various inputs 76 and outputs 78 provide connections to and from the server 14, wherein the inputs 76 are the signals or data received by the server 14, and the outputs 78 are the signals or data sent from the server 14. The network adaptor 80 couples the server 14 to a network such that the server 14 may be part of a network of computers, a local area network (LAN), a wide area network (WAN), an intranet, a network of networks, or the Internet, for example.

The memory 72 and storage 74 are accessible to the processor 70 and include processor-executable instructions that, when executed, cause the processor 70 to execute a series of operations. The series of operations may occur during the installation and installation quality assurance of an entertainment center within a room of the hospitality property. As previously discussed, the entertainment center may include a set-top box and display, for example. The installation quality assurance may include verifying the room is online; verifying the room has passed a self-test; verifying the room is free of TV connection issues, HDMI connection issues, and TV control connection issues; verifying that the set-top box satisfies RF specifications; verifying that Bluetooth® devices are activated; verifying WiFi devices are activated; or verifying room number match, for example.

In one embodiment, the processor-executable instructions cause the processor to receive the installation quality assurance signal from the set-top box within an entertainment center prior to establishing installation quality assurance of the room based on the installation quality assurance signal. The processor-executable instructions also cause the processor to, substantially contemporaneously with the execution of the technical protocol to make the set-top box and the display ready for use, receive from an interactive programmable device located within the room one or more of the following: first media relative to an image of a unique identifier of the room; second media relative to a unique identifier of the set-top box; third media relative to a physical connection between the set-top box and the display; fourth media relative to a unique identifier of the display; fifth media relative to a welcome page on the display; sixth media relative to a machine-readable optical label that contains information about the status of the technical protocol; and seventh media relative to guest room spaces within the room.

The processor-executable instructions then cause the processor to establish physical quality assurance of the room based on the first, second, third, fourth, fifth, and sixth media. Further, in some embodiments, the processor-executable instructions cause the processor to establish furnishings and amenities in the room based on the seventh media. The media relative to establishing the furnishings and amenities in the room may be stored in the aforementioned database 36 of FIGS. 1A and 1B.

In some embodiments, the processor-executable instructions cause the processor to render a map view of the hospitality establishment based on obtained map data and the map view may include a graphical representation of the room and other rooms at the hospitality establishment. The processor-executable instructions, when executed, may cause the processor to render a 3-D perspective view of the hospitality establishment, a multi-floor view of the hospitality establishment, a 2-D top plan view of at least a portion the hospitality establishment, or a map view of a floor of the hospitality establishment, for example.

In some embodiments, the processor-executable instructions cause the processor to at least partially integrate or at least partially combine the at least one of the first, second, third, fourth, fifth, sixth, or seventh, media into the graphical representation of the room. The processor-executable instructions may include processor-executable instructions that, when executed, cause the processor to annotate the graphical representation of the room with data relative to the installation quality assurance or data relative to the physical quality assurance, for example. The processor-executable instructions may also include instructions that cause the processor to implement a map application configured to provide a user interface and obtain instructions from a user on the desired map view and annotations.

FIG. 4 conceptually illustrates the software architecture of a reservation application 100 of some embodiments that may make the arrangements and accommodations for a room reservation the hospitality establishment, such as hospitality property P-1 or P-*n* shown in FIG. 1B, for example. In some embodiments, the reservation application 100 is a stand-alone application or is integrated into another application, while in other embodiments the application might be implemented within an operating system. Furthermore, in some embodiments, the reservation application 100 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The reservation application 100 includes a user interface (UI) interaction and generation module 102, a hotel listing tool 104, a reservation information tool 106, map tool 108, hotel description tools 110, reservation inquiry tools 112, reservation verification tools 114, reservation confirmation tools 116, financial transaction tools 118, and a map rendering application manager 120. The reservation application 100 has access to inventory databases 122 and presentation instructions 124. The inventory databases 122 include information about hospitality property availability, price of rooms, room availability, hotel descriptions, hotel locations, and room descriptions, for example. The presentation instructions 124 store the user presentation editing operations that the reservation application 100 performs as a set of instructions.

The hotel listing tool 104 accesses the inventory databases 122 to create a hotel listing in response to a search by a user, such as a potential customer. The reservation information tool 106 may provide the hotel listings with availability and reservation information. The map tool 108 augments the hotel listing with information about the location of the hotel. The hotel description tools 110 add descriptive information to the hotel listing with details about the hotel such as the hotel's star rating, general location, and property amenities, for example. The reservation inquiry tools 112 handle acquiring such information as the user's or potential guest's name, address, telephone number, payment information, number of guests, duration of stay, and other appropriate information relative to a reservation. The reservation verification tools 114 present an interface for the user or potential guest to verify this information. The reservation confirmation tools 116 execute the reservation and provide the necessary confirmation. The financial transaction tools 118 work with the required financial transaction server 28 to complete all needed financial transactions. As will be appreciated, the reservation confirmation tools 116 and financial transaction tools 118 work in combination together. The map rendering application manager 120 renders map views of the hospitality establishment of interest and annotates the map views to facilitate the making of the reservation.

In the illustrated embodiment, FIG. 4 also includes an operating system 130 that includes input device drivers 132 and a display module 134. In some embodiments, as illustrated, the device drivers 132 and display module 134 are part of the operating system 130 even when the image editing application is an application separate from the operating system. The input device drivers 132 may include drivers for translating signals from a keyboard, mouse, touchpad, tablet, touch screen, gyroscope, accelerometer, etc. A user interacts with one or more of these input devices, which send signals to their corresponding device driver. The device driver then translates the signals into user input data that is provided to the user interface (UI) interaction and generation module 102.

Figure 5:
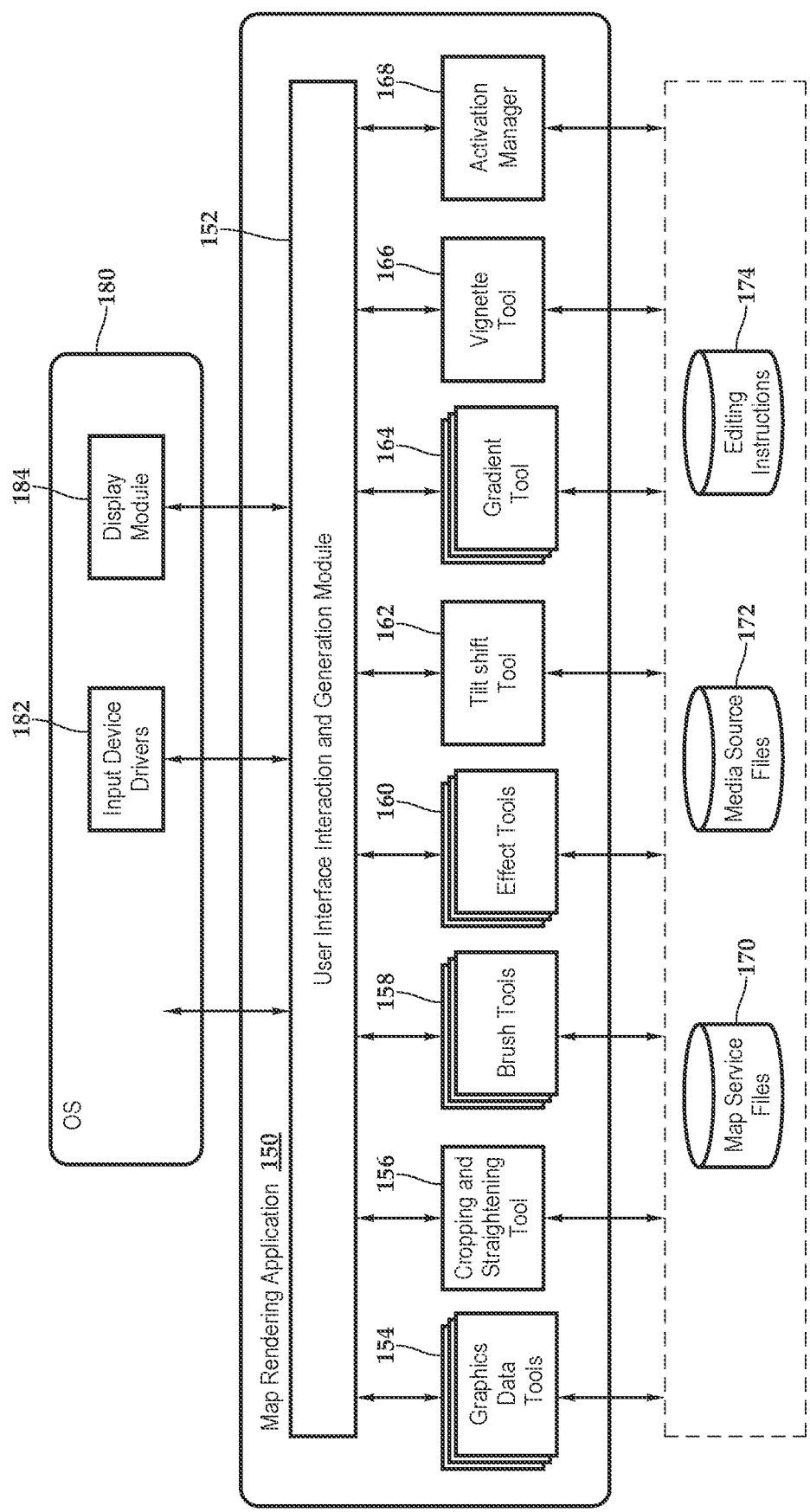
FIG. 5 is a conceptual module diagram depicting the software architecture of an image viewing, editing, and organization application of some embodiments.

FIG. 5 conceptually illustrates the software architecture of a map rendering application 150 of some embodiments that may render the map view 38 of the hospitality Property P-1. In some embodiments, the map rendering application 150 is a stand-alone application or is integrated into another application such as the map rendering application manager 120 of the reservation application 100 of FIG. 4, while in other embodiments the application might be implemented within an operating system. Furthermore, in some embodiments, the map rendering application 150 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The map rendering application 150 includes a user interface (UI) interaction and generation module 152, a graphics data tools 154, a cropping and straightening tool 156, brush tools 158, effect tools 160, a tilt shift tool 162, a gradient tool 164, a vignette tool 166, and an activation manager 168. The map rendering application 150 has access to map service files 170, media source files 172, and editing instructions 174. In some embodiments, the map service files may be vector graphics data files with texture identifiers or two or three dimensional map image files specified in one or more map tiles that may be raster-based map tiles, for example.

The media source files 172 store the media content (e.g. text, audio, image, and video content), which may be photographs, images, video files, audio-video files, panoramic photographs, or spherical photographs, for example. In one embodiment, the media source files 172 are accessed from the database 36 presented in FIGS. 1A and 1B. The editing instructions 174 store the image editing operations that the map rendering application 150 performed as a set of instructions. The map rendering application 150 uses these set of instructions to generate new images based on the original data stored in the source files. In some embodiments, the map image files and/or media content data are stored as .mov, .avi, .jpg, .png, .gif, pdf, .mp3, .bmp, .wav, .txt, .tiff, etc. files in the map service files 170 and media source files 172. In some embodiments, storages 170, 172, and 174 are all stored in one physical storage. In other embodiments, the storages 170, 172, 174 are in separate physical storages, or one of the storages is in one physical storage while the other is in a different physical storage. For instance, the other project data and the source files will often be separated.

In the illustrated embodiment, FIG. 5 also includes an operating system 180 that includes input device driver(s) 182 and a display module 184. In some embodiments, as illustrated, the device drivers 182 and display module 184 are part of the operating system 180 even when the image editing application is an application separate from the operating system. The input device drivers 182 may include drivers for translating signals from a keyboard, mouse, touchpad, tablet, touch screen, gyroscope, accelerometer, etc. A user interacts with one or more of these input devices, which send signals to their corresponding device driver. The device driver then translates the signals into user input data that is provided to the UI interaction and generation module 152.

The present application describes a graphical user interface that provides users, whether potential guests at a hotel or call center workers or reservation specialists, for example, with numerous ways to perform different sets of operations and functionalities. By either executing a pre-determined series of editing instructions on a pre-determined set of media source files or receiving a selection of media processing operations, the present map rendering application 150 provides for a map view of the hospitality establishment with the appropriate annotations to facilitate increased quantity and quality of information that may be utilized to complete a reservation such as a hotel reservation.

Figure 6A:
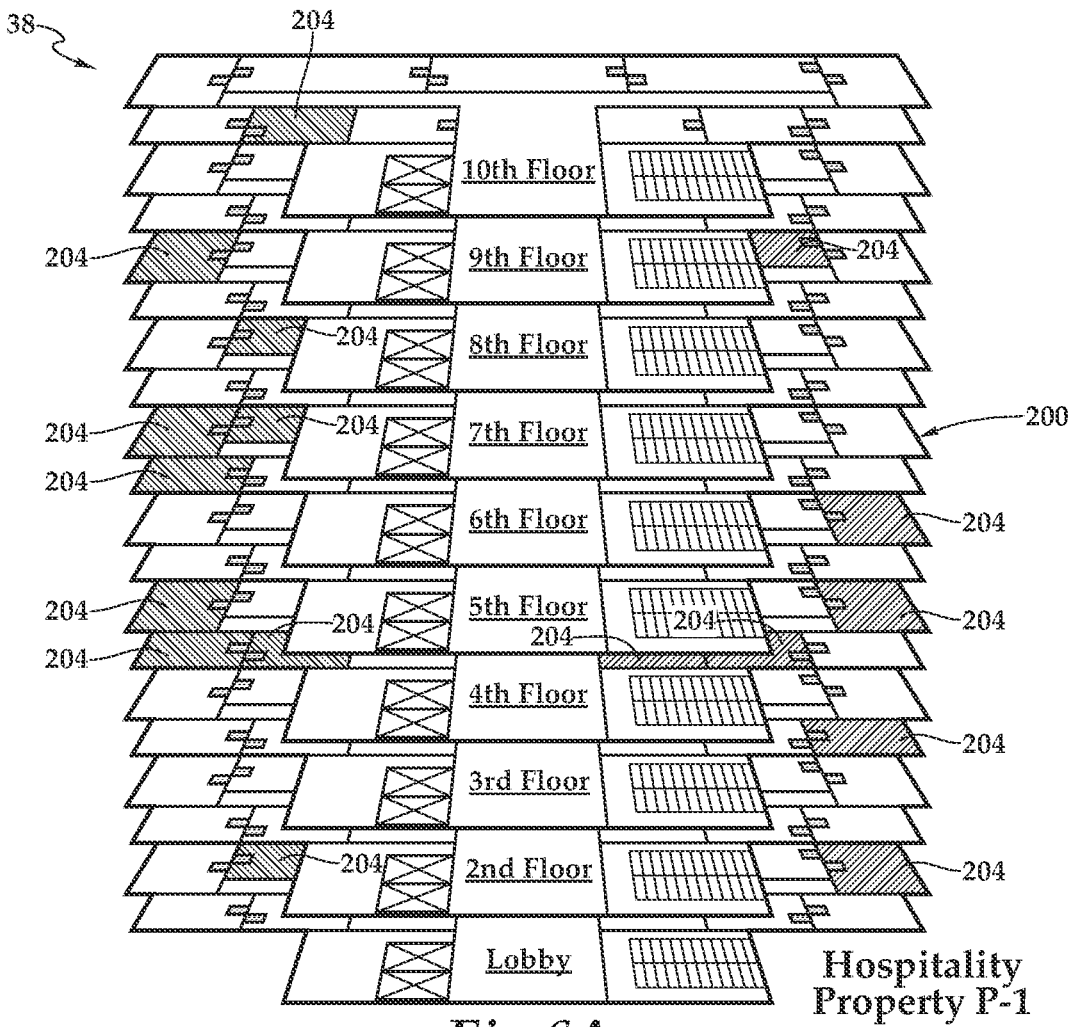
FIG. 6A is a schematic diagram depicting one embodiment of a digital representation of a hospitality lodging establishment.
Figure 6B:
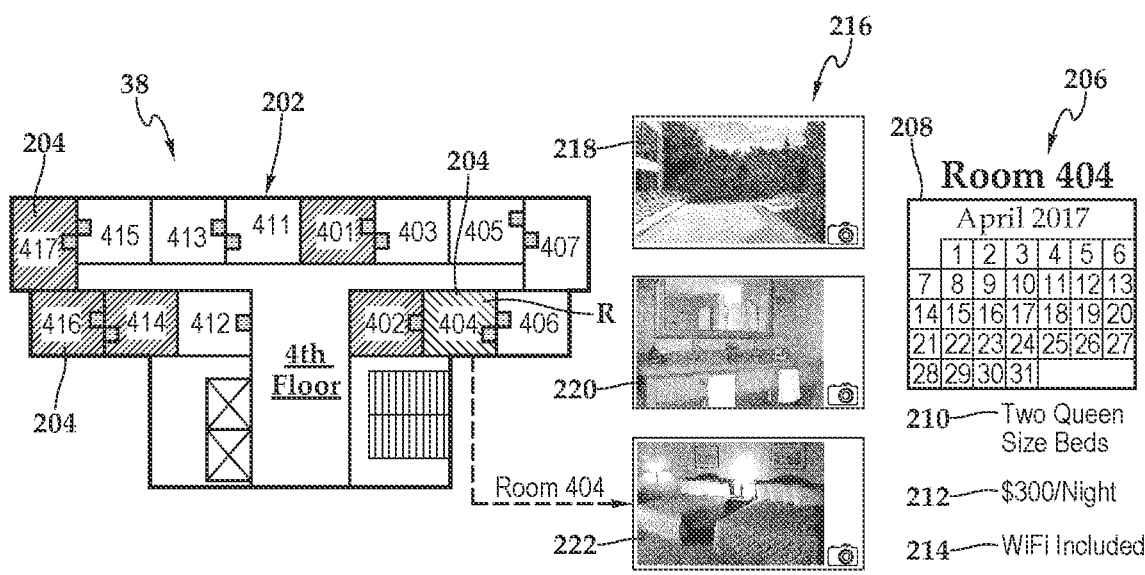
FIG. 6B is a schematic diagram depicting one embodiment of a digital representation of a floor of the hospitality lodging establishment presented in FIG. 6A.

Referring now to FIG. 6A and FIG. 6B, in one implementation, making reservations in a hospitality establishment is provided, in part, in the form of a database, or as shown, in the map view 38 of the hospitality property P-1 including a graphical presentation 200 of the entire hotel and a graphical presentation 202 of the floor of the hospitality property P-1, wherein particular hotel rooms available to accommodate a guest are displayed in substantially real time to permit a user, such as a call center worker or reservation specialist, or potential guest to select the desired information and make optimal reservation decisions. In particular, color-coding and hue assignment adds additional understanding and visibility into the availability, pricing, amenities, and other reservation conditions as well. By way of example and not by way of limitation, the hospitality establishment is graphically depicted as having a lobby and ten floors, which are lobby, $2^{nd}$ floor, 3rd floor, etc. For each floor, such as the $4^{th}$ floor, a floor layout is shown with rooms, such as rooms 401 through 407 and 411 through 417.

In FIGS. 6A and 6B, by collecting the substantially real time reservation information, a map may be shown depicting all available rooms 204 annotated with reservation data and media source files corresponding to the actual room. In particular, room 404 from FIG. 1 is highlighted to inspect the reservation data 206, including a calendar 208 showing potential arrival and departure dates, bed offering 210, pricing 212, and amenities 214. Additionally, room 404 is annotated with media source files 216 showing an actual image or video, for example, of the view from the window 218, the bathroom 220, and the bed offering 222. With this information and visual media, a potential guest may make an informed decision on a particular room to reserve. As mentioned, it should be appreciated that other types of images or video, for example, may be included. To view the media source files associated with each room and taken from each room, the map view users can select a room from the map and appropriately click or tap on the rooms and then select the room photos or other image processing operations requested.

With respect to FIGS. 6A and 6B, some embodiments of the system presented herein allow guests to view available rooms using a 3D model of the hospitality establishment, with an indication of the room availability. Guests are able to select a room and view internal pictures and videos of the room, for example, that show in detail room floor plans, furniture, interior color, finishing, and bathroom features, for example. Also, guests may be able to see the room view to the outside. With such features, guests have visibility to the location of the room with respect to the surrounding rooms or building facilities, such as elevators.

With respect to implementation, the map may include the floor plans of all parts of the hospitality establishment, including guest rooms, conference rooms, offices, lobby, fitness, business office, restaurants, bars, shops, electrical rooms, storage, elevators, stair wells, and all outdoor facilities, for example. Interior room information may include the floor plan, type of bed, number and placement of televisions, number of placement of windows and doors, and patio and balcony configurations, for example. As previously discussed, the necessary information may be gathered by a smartphone or tablet, for example, and a server may process the information.

Figure 7:
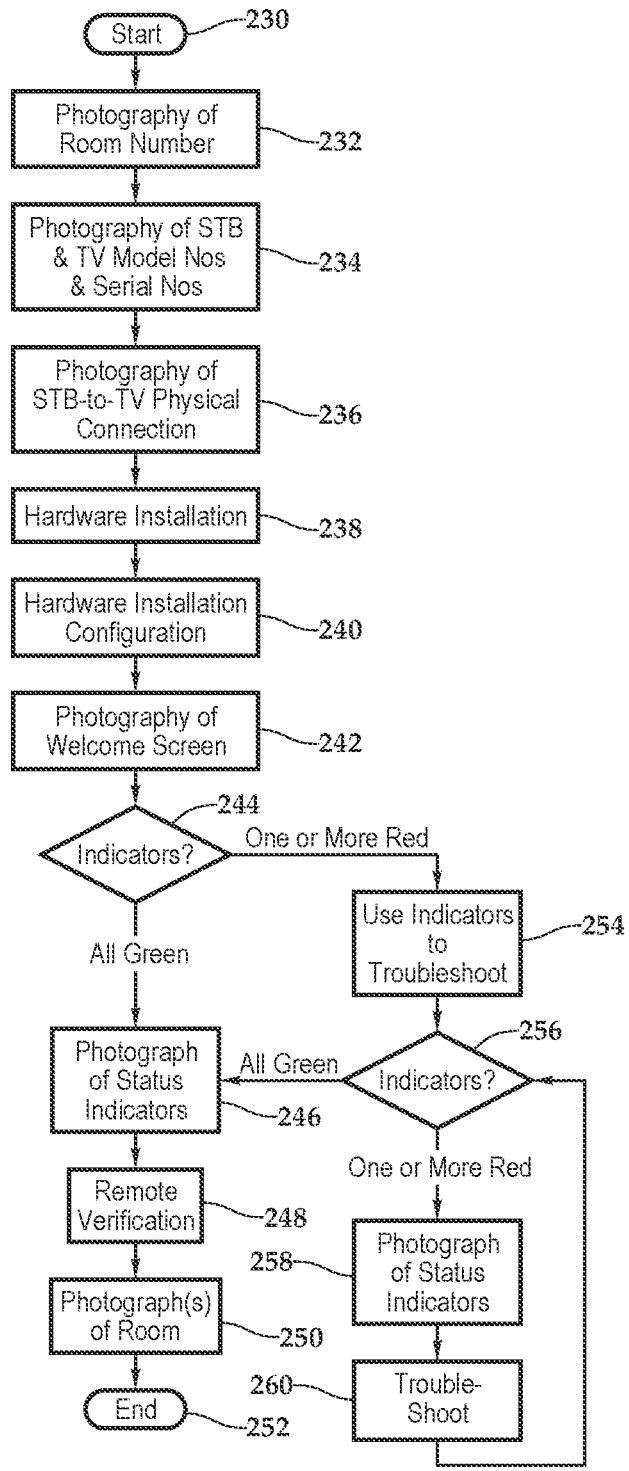
FIG. 7 is a flow chart depicting one embodiment of a method for providing an entertainment center technical configuration according to the teachings presented herein.

Referring now to FIG. 7, one embodiment of a method utilizing entertainment centers and particularly set-top boxes with installation, as an example, within the hospitality lodging industry for creating a database with media source files for use with a hospitality establishment reservation system is depicted. It should be appreciated that the methodology presented herein is also applicable to maintenance and repair as well. At block 230, the methodology is initiated during the quality assurance and physical assurance phases of the installation of the entertainment center with a set-top box and display, for example, within a room of the hospitality establishment. The methodology is advanced to block 232 where a photograph of the room number on the door, for example, is taken to remotely establish physical quality assurance. The photograph is forwarded to the remote server. At block 234, the model and serial numbers of the components of the entertainment center, including the set-top box and the display, are photographed and the photograph is forwarded to the remote server. At block 236, following the installation technician completing the physical connections within the entertainment center, photographs of the physical connections are captured and the photographs are forwarded to the remote server. At block 238, the hardware installation begins with the various connections of the set-top box and television being completed. At block 240, the installation technician initializes the installation configuration of the set-top box by, in one embodiment, actuating a code on a remote control associated with the set-top box. At block 242, the installation technician is prompted to capture a photograph of a welcome screen on the display to further the remote establishment of physical quality assurance. The photograph is forwarded to the remote server. At decision block 244, as the installation process progresses, the installer views the television screen for the visual indicators, which, in one implementation, light green or red to show progress on several installation protocol items.

If the visual indicator lights are all green, then the methodology advances to block 246, where the installer captures a photograph or image of the machine-readable optical label and forwards the same at block 248 to a verification system, which may be a property server on-site or alternatively, a property management or maintenance server off-site. It should be appreciated that other forms of verification, including communication between any on-site property server or an off-site property management server may also occur with the set-top box as part of the installation process. The transmission of the machine-readable optical code by an alternative route, i.e., mobile device backchannel provides additional verification. At block 250, the technician is prompted to capture images and/or video of the room to establish the amenities and views therein. These images and/or video will be later utilized to populate the map view of the hospitality establishment and the particular room that the technician is located. At block 252, the methodology ends.

Returning to decision block 244, if one or more indicators are red, then the methodology advances to block 254 where the installer uses the indicators to trouble shoot or diagnose the problem. At decision block 256, if following diagnostic action, the indicators are all green, then the flow chart advances to previously discussed block 246. On the other hand, if one or more indicators are still red, then an image or photograph of the machine-readable optical label is captured at block 258 and transmitted at block 260 to provide escalated and remote trouble shooting. The machine-readable optical label provides diagnostic information, which can be read at the remote location to provide insight into the nature of the problem. Moreover, often during installation and maintenance when issues occur, the set-top box under work may not be in communication with the remote site. Therefore, the methodology presented herein provides an alternative channel of communication of data relevant to the installation issue. Following block 260, the methodology returns to decision block 256.

Figure 8:
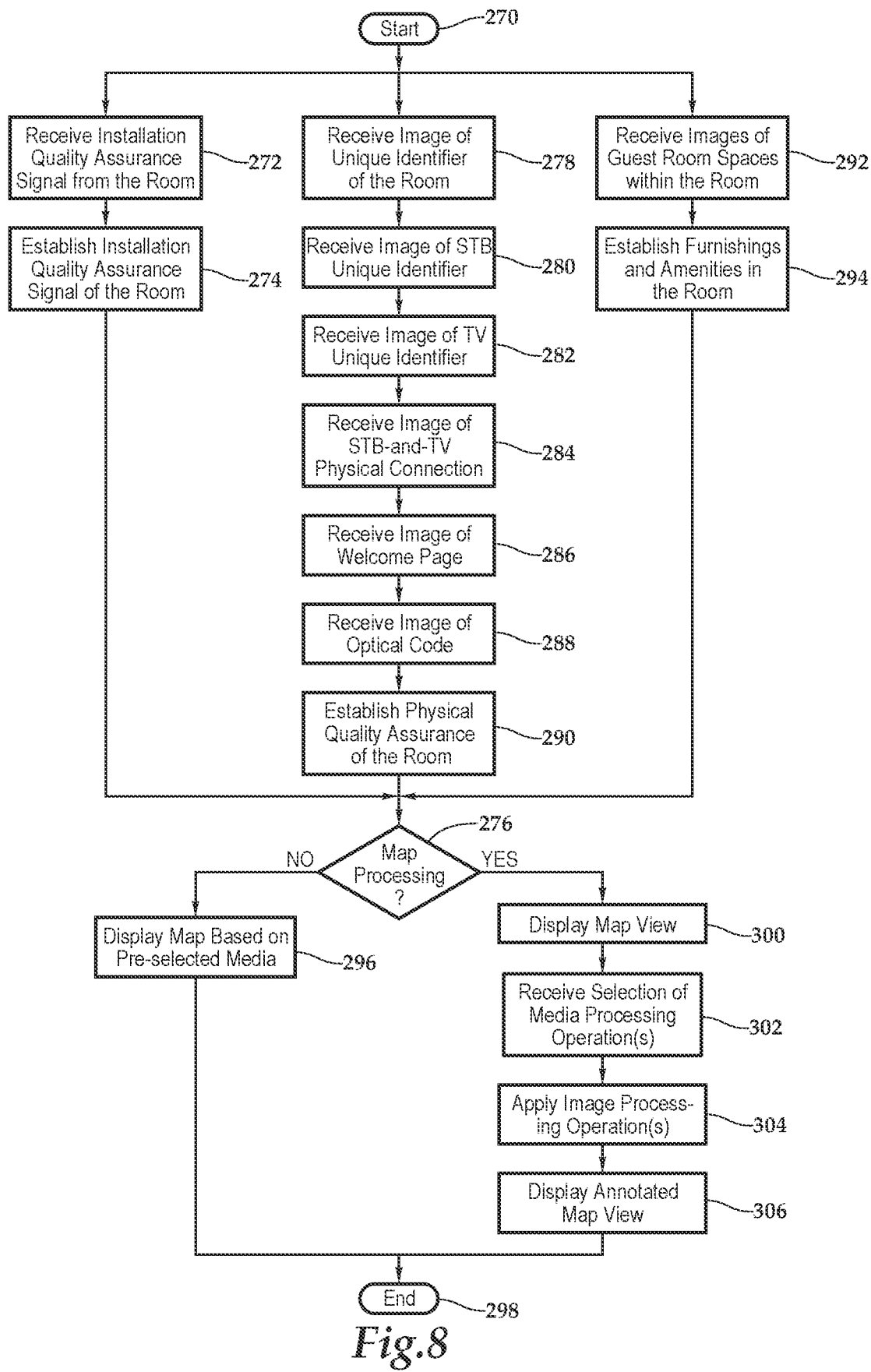
FIG. 8 is a flow chart depicting another embodiment of a method for providing an entertainment center technical configuration according to the teachings presented herein.

Referring now to FIG. 8, a method for making reservations in a hospitality establishment is presented. At block 270, the methodology is initiated and advanced to block 272 where the server receives an installation quality assurance signal from the room via the installer technician and the interactive programmable device. The installation quality assurance may include, by way of example, at least one task including verifying the room is online; verifying the room has passed a self-test; verifying the room is free of TV connection issues, HDMI connection issues, and TV control connection issues; verifying that the set-top box satisfies RF specifications; verifying that Bluetooth® devices are activated; verifying Wi-Fi devices are activated; and verifying room number match, for example. At block 274, prior to advancing to map processing decision block 276, the server utilizes the installation quality assurance signal to establish installation quality assurance in the room. Substantially contemporaneously with the execution of blocks 272 and 274, at block 278, the server receives media, which may be a photograph or video, for example, of a unique identifier, such as a room number on a door, of the room. At blocks 280, 282, 284, 286, and 288, the server respectively receives media relative to a unique identifier of the set-top box, media relative to a unique identifier of the display, media relative to the physical connection between the set-top-box and the display, media relative to a welcome page on the display, and an image of a machine-readable optical label from the display, for example. At block 290, the server utilizes the media captured during blocks 278 through 288 to remotely establish physical quality assurance of the room. At block 276, the methodology advances to the map processing decision block.

In some embodiments, substantially contemporaneously with the execution of blocks 272 and 274 as well as blocks 278 through 290, at block 292, the server receives media relative to guest room spaces within the room. By way of example and not by way of limitation, the media relative to guest room spaces within the room may include audiovisual media such as bathroom area audiovisual media, dressing area audiovisual media, clothes storage area audiovisual media, sleeping area audiovisual media, work area audiovisual media, entry area audiovisual media, window view audiovisual media, and hallway area audiovisual media. At block 294, the server utilizes the media received at block 292 to establish the furnishing and amenities in the room to create a virtual experience and virtual documentation of the room. The methodology then advances to decision block 276.

At decision block 276, if the map processing including any applied annotations are based on a pre-selected or pre-stored or pre-defined criteria, then the methodology advances to block 296 where the appropriate map view is rendered prior to, at block 298, the methodology ending. On the other hand, at decision block 276, if user input will be sought on the map view and annotations then the methodology displays the map view at block 300. Then at block 302, the server receives selection of media processing operations from the user and then applies the image processing operations at block 304. The media processing operations may include, for example, selecting the media to be displayed and various luminance and color properties and such to provide further visibility into the map view. At block 306, the map view with annotations is rendered prior to the methodology ending at block 298.

Figure 9:
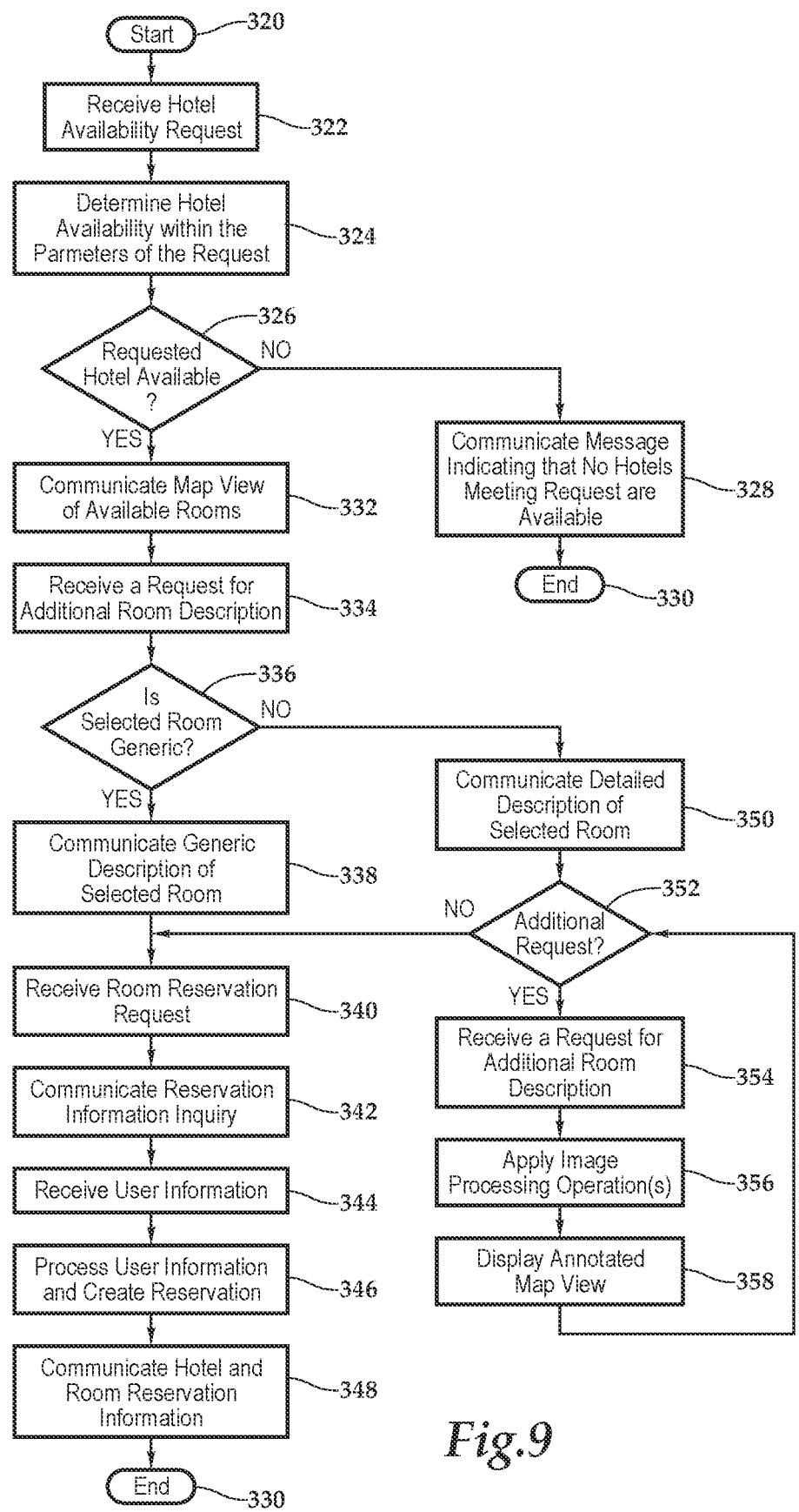
FIG. 9 is a flow chart depicting one embodiment of a method for making a reservation using the reservation system.

FIG. 9 illustrates an exemplary method for making a reservation using the reservation system 10. The method starts at block 320 and at block 322 the server receives a hotel availability request from a user. As described above, the hotel request may be communicated over the Internet from a user at a computer, may be received at call center from a user of a telephone, or may be received by the server in any other appropriate manner. Again, all references below to the communication through a network between the user and server apply equally to communications between server and an operator at call center and communications between the operator and a user of a telephone. The hotel availability request may include one or more parameters that a hotel must meet, such as a location, dates of availability, rating, or any other suitable parameters. At block 324, the server determines one or more available hotels that meet the parameters of the request by accessing information stored in the inventory databases. If the server determines at decision block 326 that no hotels meet the parameters, then the server communicates a message to the user at block 328 indicating that no hotels meeting the request are available. The method may then end at block 330 and the server may allow the user to try another search.

If the server determines at decision block 326 that the requested hotel meets the parameters of the request, then the server communicates a list of available rooms with the appropriate map view of the hotel to the user at block 332. In one implementation, the map view of the hotel may have the available rooms satisfying the parameters of the request highlighted or otherwise brought to the user's attention. The server may then receive a request for a room description at block 334. The server determines at decision block 336 whether the hotel room listing for which the description was requested is a generic hotel listing or a specific hotel listing. If the hotel room listing is a generic hotel listing, the server communicates a generic hotel description, to the user at block 338.

If the hotel listing is a specific hotel listing, the server communicates a more detailed hotel description, to the user at block 350. Returning to block 338, the server may then receive a hotel reservation request from the user at block 340 indicating that the user desires to reserve a room at a selected hotel. At block 342, the server communicates a reservation information inquiry to the user requesting information about the user to be used in making the reservation. The requested information may include the user's name, address, telephone number, and credit card number. The server receives the user information at block 344 in response to the reservation information inquiry and processes the information at block 346 to create a reservation as specified by the user. As described above, the server may verify that the user information received is correct before processing the user information. To confirm, the server then communicates specific hotel reservation information and confirmation at block 348 before the methodology ends at block 330.

Returning to block 350, following the server providing the detailed description of the selected room at block 350, at decision block 352, if no additional information about the room is requested, then the methodology advances to block 340. On the other hand, if additional information is requested then at block 354, the additional request is received and at block 356 the applicable image processing operations are applied to annotate the map view with the additional information requested. Then at block 358, the annotated map view is displayed before the methodology returns to decision block 352. With this methodology, the map view presented of the hospitality establishment includes a graphical representation of the room as well as other rooms. In response to the room being selected, the graphical representation of the selected room is annotated with room reservation data and at least one of the media source files of the selected room and the server may execute a reservation for the selected room. The map source files are captured images and/or video of the actual room to be reserved and, in one embodiment, the map source files may be captured during the installation of room's entertainment center.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for making reservations in a hospitality establishment, the system comprising:
    an interface configured to communicate with a server located remote to a room of the hospitality establishment, the server including:
        a housing securing inputs, outputs, a processor, non-transitory memory, and storage therein,
        a busing architecture communicatively interconnecting the inputs, the outputs, the processor, the memory, and the storage, and
        the storage providing access to a database including a plurality of media source files populated substantially contemporaneously when an entertainment center in the room is made ready for use, the media source files being relative to guest room spaces inside the room; and
    the non-transitory memory accessible to the processor, the non-transitory memory including processor-executable instructions that, when executed, by the processor cause the system to:
        render a map view of the hospitality establishment based on obtained map data, the map view including a graphical representation of the room and a plurality of other rooms at the hospitality establishment,
        annotate the graphical representation of the room and the plurality of other rooms, to indicate room availability,
        annotate, in response to receiving the room as a selected room, the graphical representation of the selected room with room reservation data,
        annotate the graphical representation of the selected room with at least one of the plurality of media source files of the selected room, and
        execute a reservation for the selected room.

2. The system as recited in claim 1, wherein the hospitality establishment is selected from the group consisting of furnished multi-family residences, dormitories, lodging establishments, hotels, hospitals, and multi-unit environments.

3. The system as recited in claim 1, wherein the media source files further comprise audiovisual media of the room selected from the group consisting of bathroom area audiovisual media, dressing area audiovisual media, clothes storage area audiovisual media, sleeping area audiovisual media, work area audiovisual media, entry area audiovisual media, window view audiovisual media, and hallway area audiovisual media.

4. A system for making reservations in a hospitality establishment, the system comprising:
    an interface configured to communicate with a server located remote to a room of the hospitality establishment, the server including:
        a housing securing inputs, outputs, a processor, non-transitory memory, and storage therein,
        a busing architecture communicatively interconnecting the inputs, the outputs, the processor, the memory, and the storage,
        the storage providing access to a database including a plurality of media source files populated substantially contemporaneously when the room is made ready for use, and
    the media source files being relative to guest room spaces within the room, the media source files being audiovisual media of the room selected from the group consisting of bathroom area audiovisual media, dressing area audiovisual media, clothes storage area audiovisual media, sleeping area audiovisual media, work area audiovisual media, entry area audiovisual media, and hallway area audiovisual media; and
    the non-transitory memory accessible to the processor, the non-transitory memory including processor-executable instructions that, when executed, by the processor cause the system to:
        render a map view of the hospitality establishment based on obtained map data, the map view including a graphical representation of the room and a plurality of other rooms at the hospitality establishment,
        annotate the graphical representation of the room and the plurality of other rooms to indicate room availability,
        annotate, in response to receiving the room as a selected room, the graphical representation of the selected room with room reservation data,
        annotate the graphical representation of the selected room with at least one of the plurality of media source files of the selected room, and
        execute a reservation for the selected room.

5. The system as recited in claim 4, wherein the hospitality establishment is selected from the group consisting of furnished multi-family residences, dormitories, lodging establishments, hotels, hospitals, and multi-unit environments.

6. The system as recited in claim 4, wherein the media source files further comprise files selected from the group consisting of visual files and audiovisual files.

* * * * *